United States Patent [19]

Miwa

[11] Patent Number: 4,509,524
[45] Date of Patent: Apr. 9, 1985

[54] ULTRASONIC MEDIUM CHARACTERIZATION SYSTEM

[75] Inventor: Hirohide Miwa, Kawasaki, Japan

[73] Assignee: Fujitsu Limited, Kawasaki, Japan

[21] Appl. No.: 426,700

[22] Filed: Sep. 29, 1982

[30] Foreign Application Priority Data

Sep. 30, 1981 [JP] Japan ............................. 56-155271

[51] Int. Cl.³ ................................................ A61B 10/00
[52] U.S. Cl. ...................................... 128/660; 73/597
[58] Field of Search ............... 128/660, 661; 73/599, 73/600, 631

[56] References Cited

U.S. PATENT DOCUMENTS

| 4,016,750 | 4/1977 | Green | 73/599 X |
| 4,057,049 | 11/1977 | Hill | 73/599 X |
| 4,389,893 | 6/1983 | Ophir et al. | 128/660 X |
| 4,398,423 | 8/1983 | Takahashi | 73/631 |
| 4,414,850 | 11/1983 | Miwa et al. | 73/599 |
| 4,452,082 | 6/1984 | Miwa | 73/599 |
| 4,459,853 | 7/1984 | Miwa et al. | 73/626 |

FOREIGN PATENT DOCUMENTS

| 49-38490 | 8/1972 | Japan | 73/599 |
| 49-25785 | 3/1974 | Japan | 73/599 |

Primary Examiner—Kyle L. Howell
Assistant Examiner—Francis J. Jaworski
Attorney, Agent, or Firm—Staas & Halsey

[57] ABSTRACT

This invention relates to a system which characterizes a inhomogeneous medium such as living body tissue by transmitting the ultrasonic wave including plurality of different frequencies to a measuring medium and analyzing the reflected wave from said medium. Generally the ultrasonic waves including different frequencies have respectively different frequency dependent acoustic field profiles. This invention is characterized in that such frequency characteristic of a measuring system is obtained by previously measuring the reflected waves from the reference reflector placed in the reference medium which is homogeneous or weakly inhomogeneous and has almost ignorable or frequency independent attenuation in order to eliminate adverse influence on the received wave due to said difference, such adverse characteristic is stored in the memory, and thereby the signal received when measuring a medium is compensated by said compensating data stored in the memory.

10 Claims, 2 Drawing Figures

ULTRASONIC MEDIUM CHARACTERIZATION SYSTEM

BACKGROUND OF THE INVENTION

This invention relates to a medium characterization system using reflected ultrasonic waves wherein attenuation data from the medium is measured by sending and receiving ultrasonic waves from an inhomogeneous medium, such as biological tissue. The invention particularly relates to a medium characterization system using reflected ultrasonic waves wherein the influence on the received signal, generated by different transmitting fields, corresponding to the sending frequencies, can be eliminated during measurement by sending ultrasonic waves having different frequencies.

In the field of diagnostic inspection of human bodies and flaw detection of metallic materials the characterization of a medium by transmitting and receiving ultrasonic waves is widely used. Particularly, as a system used for diagonstic inspection of the human body, an ultrasonic wave diagnostic system is already in practical use, but such as ultrasonic wave diagnostic system displays only the received signal which is reflected from a heteroacoustic point of a tissue at a location which depends on the elapsed travel time of the wave from the ultrasonic wave transmitting point. Recently, it has been attempted to measure the quality of tissues by analyzing this reflected wave and it is also expected that such a diagnostic system is put into practical use in view of further raising the diagnostic effect.

For example, Japanese laid-open patents Nos. 49-25785 and 49-38490 disclose systems wherein ultrasonic waves of two different kinds of frequencies are transmitted into a medium, the reflected waves of respective frequencies are received, and attenuation data for the medium can be measured from a ratio of the amplitude of the received signals to their respective frequencies. According to such disclosed techniques, the influence on the reflection rate caused by the angle and smoothness of the surface of the heteroacoustic point is eliminated. Data indicating only the attenuation of the ultrasonic waves caused by the internal tissues of the medium can be extracted from the waves reflected by the heteroacoustic point, and a qualitative diagnosis can be made of the medium tissues. Namely, the characteristics of a tissue can be discriminated and the quality of such tissue can be diagnosed.

On the other hand, the technique disclosed above also teaches that an error in measurement is easily generated when the intensity of the reflected wave is weak. Therefore the inventor of the present invention has developed a technique of measuring attenuation data for a medium by comparing the shape of the intensity spectrum of the transmitted wave and the received wave. This technique is presented in U.S. Pat. No. 4,452,082, corresponding to Japanese patent application No. 56-65536.

However, the dislcosed techniques indicate that they are based on the assumption that the transmitted ultrasonic wave beam has a one dimensional structure and is one-dimensionally propagated. Other improvements are necessary for an ultrasonic wave beam which has a three-dimensional structure and propagates three-dimensionally.

Namely, the profile of an ultrasonic wave beam which has a three-dimensional structure and which propagates three-dimensionally changes depending on the transmitting frequency, and the effective measuring volume included in the beam also changes depending on the frequency. Therefore, when using a transmitting wave having a plurality of frequencies, the influence of the medium in which the waves travel on the different frequencies of received signals is different and depends on the transmitting frequency according to the effective measuring volume. The received wave includes variations due to the frequency dependent effective measuring volume and variations due to the frequency dependency of the medium itself. Thus, it is necessary to be sure that the beam of transmitted ultrasonic waves is not dependent on frequency even when the transmitting frequency changes.

With this background, a method where the diameter of the ultrasonic wave transducer aperture is changed in accordance with the transmitting frequency and the ultrasonic wave beam of each transmitting frequency has the same three-dimensional characteristics is presented in U.S. Pat. No. 4,459,853, corresponding to Japanese Patent Application No. 56-48275, "Measuring System Using Ultrasonic Wave". A method where the reflected waves are selectively received only from the overlapped area of each transmitting frequency is presented in Japanese Laid-Open Patent No. 57-191546, corresponding to Japanese Patent Application No. 56-76986, "Ultrasonic Wave Measuring System." According to these patent applications, it is possible to achieve substantial frequency independence of the beam shape because the real acoustic field can be made frequency independent by controlling the transmitting field and/or the receiving field.

If the real acoustic field can be made frequency independent by controlling the transmitting field, (for example, in a reference medium such as water, which has approximately the same sound velocity as the measuring medium, is homogeneous and has no or weak frequency dependent attenuation) the frequency component (for example, spectrum shape) of the received echo signals from the various depths of the acoustic field must be similar to each other.

However, when there is a small error in the control of the transmitting acoustic field and there are many frequency components to be considered, e.g., a continuous spectrum, it is very difficult to make the real acoustic field frequency independent. Moreover, it is also difficult to cover both near and far acoustic fields with a single transmission control and even if both near and far acoustic fields are covered by two types of transmission control, it is still difficult to make the real acoustic field frequency independent in the transition range between the near and far acoustic fields.

For this reason, the frequency component data, for example, the spectrum distribution shape, at each depth in the acoustic field is no longer similar to the data of other depths, even in the reference medium.

In the case of a method allowing for the frequency dependence in the transmitting acoustic field and eliminating the dependency of the real acoustic field by control of the receiving acoustic field the similarity of the frequency component data of reflected waves from each depth in the acoustic field, for example, spectrum distribution shape, is particularly deteriorated. In other words, the acoustic field formed by transducers having the same aperture diameter has a divergence angle inversely proportional to the wavelength of the ultrasonic waves in the far field, and therefore, the ratio of the high to the low frequency components is lowered because the low frequency element diverges into a wider solid angle than that of the high frequency element as the depth increases. Even if the ultrasonic waves are reflected from the frequency independent reflector placed at each depth, the shape of the spectrum distribution of the waves reflected from each depth is no longer similar even in the reference medium.

As explained above it is actually impossible to keep the spectrum distribution shape unchanged for different depths of the reflection point. This is so even when control of the transmitting acoustic field and receiving acoustic field is carried out, and even when the measurement is carried out in a medium which is homogeneous, has almost the same sound velocity and has no or very weak frequency dependent attenuation, such as a reference medium of, for example, water. For this reason, there is a problem that the characterization of the measuring medium is also influenced by changes in the spectrum shape, depending on the depth of such reflecting point, and it is not possible to separate such changes from that of the frequency dependency of the measuring medium itself.

SUMMARY OF THE INVENTION

It is an object of the present invention to provide an ultrasonic inhomogeneous medium characterization system which eliminates adverse influences on the received wave which are caused by the frequency dependence of the acoustic field shape. Such adverse influences appear when a plurality of ultrasonic frequency components are transmitted.

A further object is to accurately measure characteristics of a medium, such as the attenuation data of the medium.

In order to attain the above objects, the ultrasonic inhomogeneous medium characterization system of the present invention comprises an ultrasonic wave transmitting/receiving means which transmits ultrasonic waves having a plurality of different frequency components to a medium and receives reflected waves from said medium; a measuring device for analyzing the received waves, measuring the characteristics of said medium by analyzing the frequency components received by said measuring device and generating compensating data; and a memory for storing compensating data obtained from waves reflected from reference reflectors placed at each depth in a substantially homogeneous and non-attenuative reference medium so that waves transmitted and reflected by a measuring medium are compensated by compensating data corresponding to the depth at which the waves are reflected by the measuring medium.

DESCRIPTION OF THE PREFERRED EMBODIMENT

This invention is explained by reference to the illustration of the preferred embodiment in FIG. 2.

Figure 1:
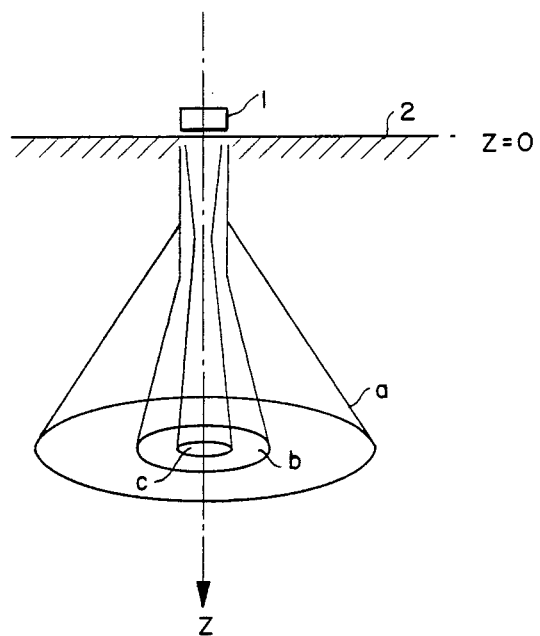
FIG. 1 illustrates the difference of the acoustic field profile for different frequencies.

In FIG. 1, a transmitting/receiving transducer 1 is composed of, for example, a piezoelectric element such as a PZT. Reference numeral 2 is a measuring medium such as a human body. The transducer 1 is placed on the surface of a medium 2. Ultrasonic waves are transmitted from the transducer 1 in the depth direction, namely Z axis, the reflected waves from respective points on the Z axis are received, and the distribution along the Z axis of frequency dependent characteristic of the medium, such as the attenuation slope, can be measured. The waves reflected from each depth along the Z axis can be discriminated in accordance with the time data by using a burst pulse or a continuous wave of the Chirp modulation or pseudo random code modulation as the ultrasonic waves. In these cases, a frequency band spreading to both sides of the center frequency F0 is always necessary.

When ultrasonic waves in a frequency band spreading to both sides of a center frequency of F1 are transmitted from the transducer 1, the beam profile (a), shown in FIG. 1, can be obtained. When ultrasonic waves in a frequency band spreading to both sides of a center frequency of F2 (F2>F1) are transmitted from the transducer 1, the beam (b) of FIG. 1 can be obtained, the ultrasonic wave beam (a) of a lower frequency spreading more than the high frequency ultrasonic wave beam (b).

According to the above-mentioned Japanese Patent Application No. 56-76986 "Ultrasonic Wave Measuring System" the region (c) of the receiving acoustic field, having no dependency on frequency, can be prepared within the solid angle where the lower frequency ultrasonic waves (a) and the higher frequency ultrasonic waves (b) overlap. However, the solid angle of region (c) in the receiving acoustic field is not uniform for the Z axis and the intensity ratio of the frequency components of F1 and F2 included in the region (c) of the receiving acoustic field is not constant. As a result, a dependency on frequency is generated in the ultrasonic wave propagation.

According to the present invention, a medium which is substantially homogeneous, has almost the same sound velocity as that of the measuring medium and has no frequency dependent attenuation or a very weak frequency dependent attenuation is used as a reference medium. Thus, the frequency characteristic of the measuring system itself is measured. Water or salt water can be used as the reference medium when the measuring medium is to be a human body. It is known that the attenuation coefficient of a human body is almost proportional to the frequency of the ultrasonic waves, while that of water is almost proportional to the square of the frequency. But, the attenuation coefficient of water as can compared with that of a human body, and therefore ignored. Body tissue is inhomogeneous but the variance of its acoustic impedance is not so large that a homogeneous medium like water cannot be used as the reference medium. A reference reflector or a plurality of reference reflectors are provided in the reference medium and it is convenient to use a planar body, a spherical body or an almost flat body having a random and rough surface as the reference reflector. For example, a metallic body such as aluminum or a plastic material is recommended. Reflectors having no frequency dependency or of a known frequency dependence can be used as the reference reflector. Such a reference reflector is fixed in the reference medium, the transducer 1 is placed in contact with the reference medium, ultrasonic waves in a frequency band surrounding a center frequency F1 are transmitted from the transducer 1, reflected waves are received and their frequency spectrum is analyzed. For example, when analysis indicates that the signal intensity of a low frequency region is relatively lower than the signal intensity for a high frequency region, a compensating signal is generated to compensate for the difference in signal intensity, resulting in a uniform frequency characteristic when the compensating signal is combined with or applied to a received signal. In the same way, the reference reflector is moved on the Z axis in the reference medium and is fixed at another point on the Z axis. Then, the transmission and reception of ultrasonic waves, analysis of reflected wave and generation of a compensating signal are carried out in the same way. These processes are carried out at every point on the Z axis and a compensating signal is generated for each point on the Z axis. The same process is carried out for ultrasonic waves in a frequency band surrounding a center frequency F2 and the compensating signal is generated for each point on the Z axis. The compensating signals are all stored in a memory. The gain of a filter circuit which extracts the center frequency component from reflected waves applied to a measuring medium, as opposed to a reference medium, is controlled by the compensating signal.

As explained above, the reflected wave, including only the frequency dependency of the medium itself, can be obtained by previously obtaining the frequency characteristic of the measuring system itself, using the reference medium, and then compensating the reflected wave at the time of measurement in such a manner that the frequency characteristics of said measuring system are eliminated from the measured reflected waves.

Figure 2:
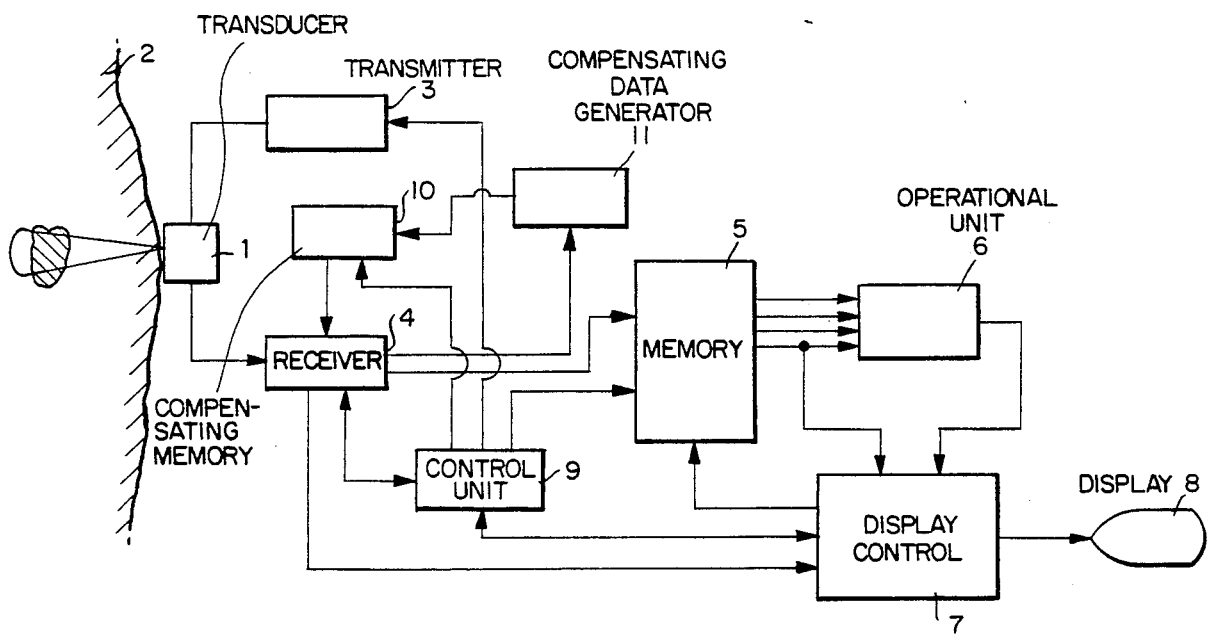
FIG. 2 is a block diagram of the preferred embodiment of the present invention.

FIG. 2 is the block diagram of the preferred embodiment of the present invention. In this figure, reference numeral 1 is a transducer which transmits the ultrasonic wave beam and receives the reflected waves as explained above and which also scans the measuring medium by changing the transmitting direction for each cycle of transmission and reception of ultrasonic waves in the center frequencies of F1 and F2. Reference numeral 3 is a transmitting unit which causes the transducer 1 to oscillate at the center frequencies of F1 and F2. Reference numeral 4 is a receiving unit including a filter circuit and an amplifier, which analyzes the output of the transducer 1 with the filter circuit and sends out the amount of energy of each reflected wave and the elapsed time from the ultrasonic wave transmitting time to the time the reflected wave is received. The transducer 1, the transmitting unit 3 and the receiving unit 4 comprise transducing means. Reference numeral 5 is a memory unit which sequentially stores the output of the receiving unit 4. Reference numeral 6 is an operation unit which obtains the attenuation slope from the amount of energy of each reflected wave for each frequency of that wave and the elapsed time of the receipt of the reflected wave from the ultrasonic wave transmitting time. Reference numeral 7 is a display control unit which generates the display data of the tomograhic plane based on the data from said operation unit 6 in synchronization with the times indicated by the receiving unit 4. Reference numeral 8 is a display unit for displaying pictures using, for example, a CRT display. Reference numeral 9 is a control unit or control means which controls changes between transmission and reception of ultrasonic waves, stores data in the memory unit 5 and controls the read timing. The control unit 9 is connected to the receiver 4 and the transmitter 3. Reference numeral 10 is a compensating memory, connected to the receiver 4 and the control unit 9, for storing compensating data. Reference numeral 11 is a compensating data generating circuit or measuring means, connected to the compensating memory 10, and the receiver 4, which analyzes the frequency of the received signals and generates the compensating data. The compensating memory 10 and the compensating data generating circuit 11 comprise compensating means.

The operation of this block diagram is explained below. First, the generation of compensating data is explained. As a measuring medium 2, the above-mentioned reference medium (for example, water) is prepared. The control unit 9 causes the transmitting unit 3 to oscillate the transducer 1 to transmit ultrasonic waves in a frequency band surrounding the center frequency F1. The control unit 9 sends the send timing signal to the receiving unit 4, causing it to prepare for reception and to start the timing operation with a timer circuit. The waves reflected from a reference reflector in the reference medium are received by the transducer 1 and then sent to the receiving unit 4. When a signal which is larger than a particular fixed level is received the receiving unit 4 considers it as a reflected wave and amplifies it with an amplifier and filters the signal having a center frequency of F1 with a filter circuit. The filtered signal is sent to the compensating data generating circuit 11 or compensating means and is analyzed. Namely, the relative intensity variation of the frequency component of the signal having a center frequency F1 and a specified bandwidth surrounding the center frequency is obtained. The signal for compensating for the relative intensity variation for each frequency in the bandwidth surrounding the center frequency F1 is generated by the compensating data generating circuit 11 and this compensating data is stored in the compensating memory 10.

As explained previously, reference reflectors are provided at each point on the Z axis, thus, reflected waves corresponding to each point can be obtained and the generated compensating data is stored in the compensating memory 10 in accordance with an address corresponding to the distance from the transducer 1 to the reflecting point.

In the same way, compensating data is generated for the ultrasonic waves in the frequency band surrounding the center frequency F2 and the generated compensating data is stored in the compensating memory 10.

This compensating data can include compensation for the frequency dependency of the reference reflector if a reflector such as a sphere, which has well known frequency dependency, is used as the reference reflector. This compensating data is not required to be changed, so long as the measuring medium is similar to the reference medium.

Biological tissue is inhomogeneous media and its scattering (as used here "scattering" represents reflection, scattering, refraction and diffraction) and its attenuation of ultrasonic waves have a frequency dependency; this frequency dependency can be a parameter of the tissue characteristics. However, in this invention, the ratio of the variance of the acoustic impedance to the mean is not too large, so the following approximation is employed.

The geometrical propagation of the ultrasonic wave in the tissue can be assumed to be same as in the homogeneous medium and the frequency dependency due to geometrical propagation in the tissue can be calculated with the experimentally obtained data due to geometrical propagation in the homogenous or weakly inhomogeneous medium which has almost no attenuation, namely the reference medium.

On the other hand, during the measuring of a medium, the control unit 9 causes the transmitting unit 3 to oscillate the transducer 1 at a center frequency F1. The control unit 9 also sends the send timing signal to the receiving unit 4 and causes it to prepare to receive and start its timing operation in the comprised timer circuit. The reflected wave from a heteroacoustic point in the medium is received by the transducer 1 and then sent to the receiving unit 4. When a signal of a higher level than the specified level is received, the receiving unit 4 considers it as the reflected wave and amplifies it and then extracts the signal of the center frequency F1. In this case, the filter circuit is structured so that the gain for each frequency at each depth is varied depending on the input from the memory 10. The control unit 9 reads the compensating data for frequency F1 from said compensating memory 10, in accordance with the distance signal obtained by the output of the timer circuit, and controls the gain of filter circuit. The output of the filter circuit is a signal indicating the frequency characteristic of the measuring medium itself and is compensated for the frequency dependency of the measuring system. The output of the filter circuit is converted to an amount of energy by the conversion circuit and this amount of energy is converted to digital data as an output of the receiving unit 4. The receiving unit 4 sends the reflected energy value and time output of the timer circuit, when this reflected wave is received, to the memory unit 5 where these values are stored.

As explained above, the reflected energy value and time output corresponding to the reflected wave from each heteroacoustic point in the medium are sequentially stored on a time series basis.

In the same way, the control unit 9 causes the transmitting unit 3 to oscillate the transducer 1 at a center frequency F2 and the receiving unit 4 receives the reflected wave from a medium. The comprised amplifier circuit amplifies the received signal and extracts the signal of center frequency F2. The control unit 9 reads the compensating data of frequency F2 from said compensating memory 10 in accordance with the distance signal obtained from the output of the timer circuit and controls the gain of the filter circuit. The output of the filter circuit is converted into an energy value by the conversion circuit and is then converted into a digital value and is used as an output of the receiving unit 4. The receiving unit 4 sends this reflected energy value and the time output of timer circuit, when this reflected wave is received, to the memory unit 5.

For the signal which has a frequency F2, the reflected energy value and time output corresponding to the reflected wave from the heteroacoustic points are sequentially stored on a time series basis.

The operation unit 6 calculates the attenuation slope from the stored data of memory unit 5. The structure of an operation unit for performing such a function is explained in detail in U.S. Pat. No. 4,414,850, corresponding to Japanese Patent Application No. 55-74680, "Measurement Method and System Utilizing Ultrasonic Wave." Therefore, a detailed explanation is omitted here, but the operations are carried out as explained below.

First, the propagation speed in the measuring medium is considered as V, the reflection energy value for wave i for the transmitting frequency F1 is obtained from the receiving unit 4 as Ri, the reflection energy value for wave i for the transmitting frequency F2 is Ri', the time output of the reflection of wave i is Ti, the attenuation coefficient between the heteroacoustic point where the reflection of wave i is generated and the heteroacoustic point where the reflection of wave (i−1) is generated is $\mu i$, and following relation can be obtained.

$$\mu i - \mu(i-1) = -R/(V\cdot T)$$

Where, $$R = \log(Ri/Ri') - \log[R(i-1)/R(i-1)']\ T = Ti - T(i-1)$$

Therefore, the reflection energy value for wave i for the transmitting frequencies F1 and F2, corresponding to the time output of the wave i, is read from the memory unit 5. Moreover the reflection energy value of wave (i−1) for the transmitting frequencies F1 and F2, corresponding to the time output of wave (i−1) is read from the memory unit 5, a value of R is obtained by the operation of unit 6, then time output of wave i and the time output of wave (i−1) are read from the memory unit 5 and a value of T is obtained by the operation unit 6. Thereby the operation unit 6 is capable of calculating a value of $[\mu i - \mu(i-1)]$ using a known value of V.

Moreover, the attenuation slope can be obtained by the following operation.

$$\alpha = 4,343 \cdot \mu/(F1 = F2)$$

Where, $\mu = i - \mu(i-1)$

The attenuation slope or attenuation coefficient, including such attenuation slope thus obtained, is sent to the display control unit 7, which generates display data for the tomographic plane based on the data sent from the aforementioned operational unit 6 in synchronization with the receiving timing of the operational unit 6 and the distribution of attenuation data is displayed on the display unit 8, which displays the picture of tomographic plane.

In addition to above embodiment, it is also possible to store the compensating data, prepared separately, in the compensating memory, without providing the particular compensating data generating circuit 11.

According to the present invention, as explained above, it is possible to obtain a reflection signal indicating the frequency characteristic of the measuring medium itself compensated for the frequency dependency of the measuring system by providing a memory which stores compensating data for each depth. The compensation data is obtained by reflecting wave from reference reflectors placed at various depths of the reference medium and by analyzing the reflected waves to generate compensation data. Then, compensating data is applied to reflected waves received from the measuring medium. Thus, the accuracy of a qualitative measurement of a measuring medium can be improved, assuring highly accurate measurement.

The present invention has been described based on the preferred embodiment. This invention can be adapted not only for control of the receiving acoustic field but also to control the transmitting acoustic field and to cases where control is not carried out for the acoustic field. In this embodiment, two frequency bands, surrounding the center frequencies, F1 and F2, are considered, but this invention can be applied to a continuous spectrum. Namely various modifications can be made within the scope of the subject matter of the present invention and these are not eliminated from the scope of the present invention.

I claim:

1. An apparatus for characterizing an inhomogeneous medium using ultrasonic waves, comprising:

transducing means for transmitting ultrasonic waves having a plurality of frequency components to a reference medium having at least one reference reflector provided therein, receiving ultrasonic waves reflected by the reference reflector, transmitting ultrasonic waves having a plurality of frequency components to an inhomogeneous medium, and receiving ultrasonic waves reflected by the inhomogenous medium;

compensating means, operatively connected to said transducing means, for analyzing the frequency components of the ultrasonic waves reflected by each reference reflector, for generating compensating data based on the analysis of the frequency components of the waves reflected by each reference reflector and for storing said compensating data;

memory means, operatively connected to said transducing means, for storing the output of the transducing means when the transducing means receives ultrasonic waves reflected from the inhomogeneous medium;

control means, operatively connected to said transducing means, said compensating means and said memory means, for controlling said transducer means to transmit or receive and for reading the compensating data from said compensating means, for causing said transducing means to apply the compensating data to the signal received from the inhomogeneous medium, and for storing the compensated data in said memory means;

means, operatively connected to said transducing means, said control means and said memory means, for displaying said compensated data.

2. An apparatus according to claim 1, wherein said compensating means generates the compensating data based on a change between the frequency components of said transmitted ultrasonic waves and the frequency components of said received ultrasonic waves.

3. An apparatus according to claim 2, wherein said compensating means generates compensating data for each frequency component.

4. An apparatus according to claim 3, wherein a plurality of the reference reflectors are provided in the reference medium at a plurality of distances from said transducing means.

5. An apparatus according to claim 4, wherein said compensating means generates compensating data for the ultrasonic waves reflected by each reference reflector.

6. An apparatus according to claim 3, wherein said transducing means transmits ultrasonic waves in a first frequency band having a first center frequency and ultrasonic waves in a second frequency band having a second center frequency, and wherein said compensating means generates compensating data for each frequency component in said first frequency band for the ultrasonic waves reflected by each reference reflector and compensating data for each frequency in said second frequency band for the ultrasonic waves reflected by each reference reflector.

7. An apparatus according to claim 2, wherein said compensating means generates compensating data based on the amplitudes of the various frequency components.

8. A method of characterizing an inhomogeneous medium, comprising the steps of:

(a) placing at least one reference reflector in a reference medium;

(b) transmitting ultrasonic waves having a plurality of frequency components to the reference reflector;

(c) receiving the ultrasonic waves reflected by the reference reflector;

(d) analyzing the frequency components of the received ultrasonic waves and generating compensating data in accordance with the analysis of the frequency components;

(e) storing the compensating data;

(f) transmitting ultrasonic waves having a plurality of frequency components in an inhomogeneous medium;

(g) receiving the ultrasonic waves reflected by the inhomogeneous medium;

(h) applying the compensating data to the ultrasonic waves reflected by the inhomogeneous medium to generate characterization data;

(i) storing the characterization data;

(j) calculating an attenuation slope from the stored characterization data;

(k) generating display data in accordance with the attenuation slope; and (l) displaying the display data.

9. A method according to claim 8, wherein said step (a) includes providing a plurality of reference reflectors at a plurality of depths in the reference medium, wherein said step (b) includes transmitting ultrasonic waves having first and second center frequencies, and wherein said step (d) includes generating compensating data for each frequency component of the ultrasonic waves reflected from each reference reflector.

10. A method according to claim 8, wherein said step (g) includes extracting the ultrasonic waves of the first and second center frequencies.

UNITED STATES PATENT AND TRADEMARK OFFICE
CERTIFICATE OF CORRECTION

PATENT NO. :    4,509,524
DATED      :    April 9, 1985
INVENTOR(S) :   Hirohide Miwa It is certified that error appears in the above-identified patent and that said Letters Patent is hereby corrected as shown below:

On the title page;

Title, "ULTRASONIC MEDIUM CHARACTERIZATION SYSTEM" should be --SYSTEM COMPENSATION AND CALIBRATION FOR ULTRASONIC ATTENUATION CHARACTERIZATION--.

Signed and Sealed this

Twenty-fourth Day of September 1985

[SEAL]

Attest:

DONALD J. QUIGG

Attesting Officer

Commissioner of Patents and
Trademarks—Designate